United States Patent
Lai et al.

(10) Patent No.: US 9,565,744 B2
(45) Date of Patent: Feb. 7, 2017

(54) PROGRAMMABLE LIGHTING DEVICE AND METHOD AND SYSTEM FOR PROGRAMMING LIGHTING DEVICE

(71) Applicant: PHILIPS LIGHTING HOLDING B.V., Einhoven (NL)

(72) Inventors: Bing Lai, Shanghai (CN); Bernd Clauberg, Schaumburg, IL (US); Raman Nair Harish Gopala Pillai, Arlington Heights, IL (US); Alan James Marble, Hawthorn Woods, IL (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/906,404

(22) PCT Filed: Aug. 19, 2014

(86) PCT No.: PCT/IB2014/063964
§ 371 (c)(1),
(2) Date: Jan. 20, 2016

(87) PCT Pub. No.: WO2015/025267
PCT Pub. Date: Feb. 26, 2015

(65) Prior Publication Data
US 2016/0165702 A1    Jun. 9, 2016

Related U.S. Application Data

(60) Provisional application No. 61/867,326, filed on Aug. 19, 2013.

(51) Int. Cl.
*H05B 37/02*    (2006.01)
*H05B 33/08*    (2006.01)

(52) U.S. Cl.
CPC ...... *H05B 37/0272* (2013.01); *H05B 33/0842* (2013.01); *H05B 33/0845* (2013.01);
(Continued)

(58) Field of Classification Search
CPC ............ H05B 37/0272; H05B 33/0845; H05B 33/0815; H05B 33/0824; H05B 33/0842; H05B 33/0863; H05B 37/0218; H05B 37/0254; H05B 41/3921
See application file for complete search history.

(56) References Cited

U.S. PATENT DOCUMENTS 6,016,038 A    1/2000  Mueller et al.
6,181,086 B1 *  1/2001  Katyl ................. H05B 37/0254
                                              315/291

(Continued)

FOREIGN PATENT DOCUMENTS

EP       2306791 A2    4/2011
WO    2014013377 A2    1/2014

*Primary Examiner* — Vibol Tan

(57) ABSTRACT

A programmable lighting device includes a power stage, a controller, a nonvolatile memory and a near field communication device. The power stage is configured to receive power from an external supply and supplying power to at least one light source. The controller is configured to control operation of the power stage according to an operating parameter and/or configuration setting for the programmable lighting device. The nonvolatile memory device stores the operating parameter and/or configuration setting. The near field communication device receives a radio frequency signal which communicates the operating parameter and/or configuration setting, and in response thereto stores the operating parameter and/or configuration setting in the nonvolatile memory. The near field communication device generates a supply voltage for powering the nonvolatile memory device from the RF signal.

17 Claims, 6 Drawing Sheets

(52) U.S. Cl.
CPC ..... *H05B 33/0863* (2013.01); *H05B 33/0869* (2013.01); *H05B 37/0218* (2013.01); *H05B 37/0281* (2013.01)

(56) References Cited

U.S. PATENT DOCUMENTS

| | | | |
|---|---|---|---|
| 6,211,626 | B1 | 4/2001 | Lys et al. |
| 8,810,159 | B2 * | 8/2014 | Nuhfer ............... H05B 33/0815 315/291 |
| 9,239,941 | B1 * | 1/2016 | Diorio ................ G06K 19/0723 |
| 2005/0269480 | A1 | 12/2005 | Ford et al. |
| 2008/0041930 | A1 | 2/2008 | Smith et al. |
| 2008/0297070 | A1 * | 12/2008 | Kuenzler ........... H05B 37/0272 315/308 |
| 2009/0144458 | A1 * | 6/2009 | Rofougaran ....... G06K 19/0723 710/11 |
| 2013/0018522 | A1 * | 1/2013 | Nuhfer ............... H05B 33/0815 700/297 |
| 2013/0063042 | A1 * | 3/2013 | Bora ................. H05B 33/0863 315/292 |
| 2015/0296598 | A1 * | 10/2015 | Haid ................. H05B 37/0272 315/291 |

\* cited by examiner

PROGRAMMABLE LIGHTING DEVICE AND METHOD AND SYSTEM FOR PROGRAMMING LIGHTING DEVICE

CROSS-REFERENCE TO PRIOR APPLICATIONS

This application is the U.S. National Phase application under 35 U.S.C. §371 of International Application No. PCT/IB2014/063964, filed on Aug. 19, 2014, which claims the benefit of U.S. Provisional Patent Application No. 61/867,326, filed on Aug. 19, 2013. These applications are hereby incorporated by reference herein.

TECHNICAL FIELD

The present invention is directed generally to lighting devices, for example light emitting diode (LED) drivers. More particularly, various inventive methods and apparatus disclosed herein relate to a method and system for programming a lighting device, such as an LED driver.

BACKGROUND

Lighting technology continues to evolve providing enhanced functionality and efficiency for end users. For example, digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the lighting fixtures embodying these LED-based sources feature a lighting module, including one or more LEDs capable of producing different colors, e.g. red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

Commonly, one or more light sources may be driven by a lighting driver which may convert input power, for example from AC Mains, into an appropriate form for use by the particular light source, and supply the converted power to the light source(s). For example, an LED driver may receive AC Mains power, convert or format the power to an appropriate form for use by one or more LEDs, and supply the converted power to drive one or more LED-based lighting units.

To provide enhanced performance and flexibility, different lighting devices (e.g., LED drivers) may operate with one or more different configurations and/or operating parameters. Here, the term "configuration" refers to an operating mode of a lighting device. For example, LED drivers may be configured to operate with different dimming interfaces in order to dim the light source(s) which they drive. In particular, one LED driver may be configured to operate with a DALI interface, another LED driver may be configured to operate with an analog 0-10V dimming signal, still another may operate with phase-cut AC dimming, and yet another LED driver may be configured to operate with a Digital MultipleX (DMX) interface, etc. Meanwhile, the term "operating parameter" refers to a value or setting of an operational variable of the lighting device. For example, an LED driver may be configured to stop supplying current to drive an LED load if the temperature of the LED load exceeds a threshold value. This threshold value is an operating parameter of the LED driver, and may change from LED driver to LED driver, depending on a particular installation or target application for the LED driver. A variety of other configuration settings and operating parameters may change from one LED driver to another.

However, it is undesirable for a manufacturer to manufacture a large number of different lighting devices just to provide a large number of different configurations and different operating parameters—especially if large portions of the lighting devices are the same as each other. It is also undesirable for a manufacturer, vendor, and/or end user to have to maintain in inventory a large number of different lighting devices, each having its own specific configuration and/or its own specific operating parameters.

Accordingly, a manufacturer may manufacture a programmable lighting device (e.g., a programmable LED driver) which includes a programming interface or connector by means of which the device may be programmed with different configuration settings and/or with different operating parameters. In that way, a manufacturer may design and manufacture one generic lighting device for a large number of different applications or target installations, and then program each device to tailor it for its particular target application or installation. A programmable lighting device may be programmed by the manufacturer, the vendor, or the end user. For example, the manufacturer may maintain the generic programmable lighting devices in stock, and then program the devices with particular configuration setting(s) and/or operating parameter(s) to fill specific orders, prior to shipment. Also, an end user may purchase and stock one generic programmable LED driver model, and then program each device at the time of installation with the appropriate configuration setting(s) and/or operating parameter(s) for its particular application or target installation. Additionally, even after a programmable lighting device has been programmed and installed, it may be reprogrammed with one or more new operating parameters and/or reconfigured with one or more new or changed configuration settings.

However, existing methods of programming programmable lighting devices are cumbersome and relatively time-consuming. Each programmable lighting device is connected to a power supply (e.g., AC Mains) during its programming operation. Typically a connector on the device is connected to a programming device or terminal (e.g., through a matching cable). Then the configuration setting(s) and/or operating parameter(s) are transferred from the programming device or terminal to the programmable lighting device via the connector, after which the power may be removed from the programmable lighting device. Typically, the programming interface for the programmable lighting device may be an RS-232 or DALI interface. In some cases, wireless interfaces such WIFi or Zigbee may be employed, but their deployment is limited due to the high cost of implementation. Furthermore, with any of these wired or wireless interfaces, the programmable lighting device still must be supplied power, for example by plugging it into an AC outlet, during the programming operation.

When a large number of programmable lighting devices are to be programmed with a wired programming interface, either a corresponding number of connections/cables must be provided for programming the devices in parallel, or else the programmable lighting devices must be programmed in series, extending the time required for the programming operation. This programming operation may be especially burdensome for an end user, for example an end user which performs a commissioning process for a large number of lighting devices which must each be programmed. Often such an end user may have only one or a few programming device(s) or terminal(s) and corresponding connection(s) or cable(s) for programming a large number of devices, such that the programming is performed in a serial fashion. This repetitive serial individual programming operation is especially inefficient when several programmable lighting devices are all to be programmed with the same configuration settings or operating parameters.

Thus, there is a need in the art to provide a programmable lighting device, for example an LED driver, which can be easily programmed to apply one or more configuration settings and/or operating parameters thereto. There is further a need to provide an arrangement whereby several programmable lighting devices may be programmed with the same configuration settings or operating parameters at the same time.

SUMMARY

The present disclosure is directed to inventive methods and apparatus for lighting devices and for programming programmable lighting devices.

Generally, in one aspect, a programmable lighting device, comprises: a power stage configured to receive power from an external supply and to supply power to at least one light source; a controller configured to control an operation of the power stage according to at least one operating parameter or configuration setting for the programmable lighting device; a nonvolatile memory configured to store therein the at least one operating parameter or configuration setting for the programmable lighting device; and a near field communication device configured to receive a radio frequency (RF) signal which communicates the at least one operating parameter or configuration setting for the programmable lighting device, and in response thereto to store the at least one operating parameter or configuration setting for the programmable lighting device in the nonvolatile memory. The near field communication device is configured to generate from the RF signal a supply voltage for powering the nonvolatile memory while the near field communication device stores in the nonvolatile memory the at least one operating parameter or configuration setting for the programmable lighting device.

In some embodiments, the near field communication device may be further configured to generate from the RF signal a second supply voltage for powering the controller.

In some embodiments, the near field communication device may further comprise an antenna or a coil configured to provide the radio frequency signal to the near field communication device.

In some versions of these embodiments, the near field communication device may be further configured to transmit a verification signal via the antenna or coil in response to receiving the at least one operating parameter or configuration setting for the programmable lighting device.

In some versions of these embodiments, the near field communication device may be further configured to transmit via the antenna or coil at least one additional operating parameter, at least one additional configuration setting, or operating data for the programmable lighting device.

In some versions of these embodiments, the programmable lighting device may comprise a substantially metallic housing having at least one non-metallic aperture through which the radio frequency signal may be communicated to the antenna or coil.

In some embodiments, the nonvolatile memory may be a dual port memory having a first port for communicating with the near field communication device and a second and a second port for communicating with the controller.

In some embodiments, the programmable lighting device may further comprise a second nonvolatile memory, wherein the second nonvolatile memory is configured to store operating data for programmable lighting device in response to the controller.

In some embodiments, the programmable lighting device may further comprise the at least one lighting device.

In some embodiments, the at least one lighting device may include at least one light emitting diode (LED).

In some versions of these embodiments, the power stage may comprise a controllable current source for supplying a current to drive the at least one LED.

In some versions of these embodiments, the power stage is configured to receive AC Mains voltage and further comprises a rectifier for rectifying the AC Mains voltage to produce the current to drive the at least one LED.

In some embodiments, the RF signal communicates the at least one configuration setting for the programmable lighting device, wherein the at least one configuration setting identifies an active dimming interface for the programmable lighting device among a plurality of dimming interfaces available for the programmable lighting device.

In some versions of these embodiments, the plurality of dimming interfaces available for the programmable lighting device include a DALI interface, an analog 0-10V dimming signal interface, a Digital MultipleX (DMX) interface, and a phase-cut AC dimming interface.

In some embodiments, the RF signal communicates the at least one operating parameter for the programmable lighting device, wherein the at least one operating parameter for the programmable lighting device includes at least one of: an output current to be supplied by the power stage to the at least one light source; a variable startup time parameter for the at least one light source; an operating time period after which the lighting device should increase the output current; at least one temperature threshold for reducing the output current; an operating time period after which the lighting device should trigger an end of life signal; and at least one time setting for automatically dimming the at least one light source.

In another aspect, a method is provided for programming a programmable lighting device. The method comprises: receiving a radio frequency (RF) signal which communicates at least one operating parameter or configuration setting for the programmable lighting device; generating from the RF signal a supply voltage for powering a nonvolatile memory of the programmable lighting device; and while the nonvolatile memory is powered by the voltage generated from the RF signal, storing at least one operating parameter or configuration setting for the programmable lighting device in the nonvolatile memory. A power stage of the programmable lighting device is configured to receive power from an external supply and to be controlled to supply power to at least one light source according to the at least one operating parameter or configuration setting for the programmable lighting device.

In some embodiments, the method further comprises generating from the RF signal a second supply voltage for powering a controller which is configured to control the power stage.

In some embodiments, the method further comprises the controller retrieving the least one operating parameter or configuration setting for the programmable lighting device from the nonvolatile memory.

In some embodiments, the method further comprises transmitting a verification signal from the programmable lighting device in response to receiving the at least one operating parameter or configuration setting for the programmable lighting device.

In some embodiments, the method further comprises transmitting from the programmable lighting device via a reply RF signal at least one additional operating parameter, at least one additional configuration setting, or operating data for the programmable lighting device.

In some embodiments, receiving the RF signal comprises receiving the RF signal via least one non-metallic aperture in a substantially metallic housing.

In some embodiments, the RF signal communicates the at least one configuration setting for the programmable lighting device, wherein the at least one configuration setting identifies an active dimming interface for the programmable lighting device among a plurality of dimming interfaces available for the programmable lighting device.

In some embodiments, the plurality of dimming interfaces available for the programmable lighting device include a DALI interface, an analog 0-10V dimming signal interface, a Digital MultipleX (DMX) interface, and a phase-cut AC dimming interface.

In some embodiments, the RF signal communicates the at least one operating parameter for the programmable lighting device, wherein the at least one operating parameter for the programmable lighting device includes at least one of: an output current to be supplied by the power stage to the at least one light source; a variable startup time parameter for the at least one light source; an operating time period after which the lighting device should increase the output current; at least one temperature threshold for reducing the output current; an operating time period after which the lighting device should trigger an end of life signal; and at least one time setting for automatically dimming the at least one light source As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the term "different colors" implicitly refers to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "lighting device" is used herein generally to refer to a component of a lighting system. Examples of a lighting device include a lighting fixture, a lighting unit, a lighting driver, a lighting controller, and a light source.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Existing methods of programming of existing programmable lighting devices are cumbersome and relatively time-consuming.

More generally, Applicants have recognized and appreciated that it would be beneficial to provide a programmable lighting device, for example an LED driver, which can be easily programmed to apply one or more configuration settings and/or operating parameters thereto. There is further a need to provide an arrangement whereby several programmable lighting devices may be programmed with the same configuration settings or operating parameters at the same time.

In view of the foregoing, various embodiments and implementations of the present invention are directed to a programmable lighting device, and a method and system for programming a programmable lighting device.

Figure 1:
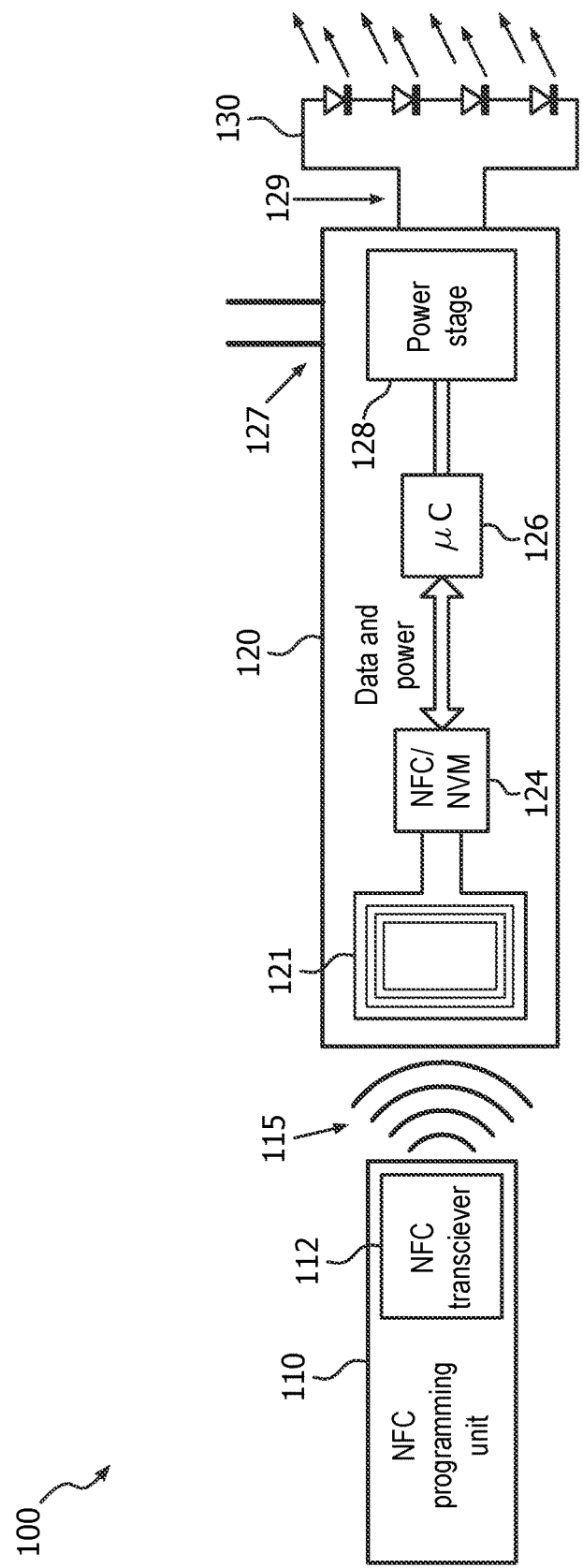
FIG. 1 illustrates an example embodiment of a system including a programmable lighting device and a near field communication programming unit for programming the programmable lighting device.

FIG. 1 illustrates an example embodiment of a system 100 including a programmable lighting device 120 and a near field communication (NFC) programming unit 110 for programming programmable lighting device 120.

NFC programming unit 110 includes an NFC transceiver 112 and an associated coil or RF antenna (not shown). In some embodiments, NFC programming unit 110 includes a host processor system and has associated therewith a user interface by means of which a user may enter one or more configuration settings and/or operating parameters to be programmed into programmable lighting device 120. In some embodiments, NFC programming unit 110 comprises a computer, such as a personal computer running an operating system such as UNIX or WINDOWS. In some embodiments, NFC programming unit 110 comprises a portable device, such as a mobile phone (e.g., a smart phone) or tablet device. In that case, NFC programming unit 110 may include a touch screen as a user interface.

Programmable lighting device 120 includes a coil or antenna 121, an NFC device 124 including an NFC transceiver and associated nonvolatile memory (NVM), a microcontroller 126, and a power stage 128.

In some embodiments, programmable lighting device 120 may be a connected to a network, in particular a lighting network (e.g., a DALI network, a DMX network, etc.). In other embodiments, programmable lighting device 120 may be a "standalone" device. Programmable lighting device 120 may be a lighting driver (e.g., an LED driver), a lighting fixture, a lighting unit, a lighting controller, etc. In some embodiments programmable lighting device 120 may include one or more light sources (e.g., one or more LEDs). In other embodiments, programmable lighting device 120 may just include a lighting driver (e.g., an LED river) and may be designed to be connected to, and to drive, an external lighting unit.

Power stage 128 receives power from an external power supply, for example 60 Hz AC Mains power at 110VAC, 50 Hz AC Mains power at 230 V, etc., via power connector 127.

Power stage 128 converts or formats the power to an appropriate form for use by lighting unit 130, which in the illustrated example is an LED-based lighting unit having a plurality of LED light sources, and supplies the converted power to lighting unit 130 via an output interface 129.

Microcontroller 126 controls a power conversion operation of power stage 128 according to one or more configuration settings and/or operating parameters.

In some embodiments, NFC device 124 and the associated NVM may be included together on a single integrated circuit. In some embodiments, the nonvolatile memory may comprise an electrically erasable programmable read only memory (EEPROM). In some embodiments, the NVM may comprise Flash memory. In some embodiments, the NVM may be segmented or partitioned, and may have separate password associated with different segments of the NVM. In this way, a manufacturer may store certain data in one or more segments of the NVM which are accessible by the manufacturer, but which may not be accessible by an end user.

In some embodiments, NFC device 124 and associated NVM may be an M24SRxxE or M24LRxxE device from STMicroelectronics. In other embodiments, various other ICs may be employed, including for example NTAG21x series devices from NXP Semiconductors, the AS3953 device from AMS AG, the TRF796Fx devices, including the TRF7970A device, from Texas Instruments, etc.

In some embodiments, NFC transceiver 112 transmits a radio frequency (RF) signal at 13.56 MHz across interface 115 which may be received by NFC device 124. In various embodiments, NFC transceiver 112 and NFC device 124 may operate in accordance with one or more industry standards, for example ISO/IEC 15693, ISO/IEC 14443 A/B, NFC Interface and Protocol (NFCIP-1; NFCIP-2), ISO-18000-3, and ISO/IEC 18092, each of which standards is incorporated herein by reference.

In some embodiments, the IC for NFC device 124 has a unique serial number associated therewith, which may be stored in an assigned location in the associated NVM.

Example programming operations for programmable lighting device 120 will now be explained.

In general, NFC transceiver 112 of NFC programming unit 110 is placed close to programmable lighting device 120 (for example within 1 cm-10 cm) and transmits data and power using an NFC RF signal, for example using a standard ISO/IEC 16593 protocol at 13.56 MHz. Programmable lighting device 120, and more specifically NFC device 124: receives data and power from NFC programming unit 110 via the NFC RF signal; uses the power to generate a supply voltage for powering the NVM; and while it powers the NVM with the supply voltage generated from the received NFC RF signal, NFC device 124 stores the data into the NVM. When programmable lighting unit 120 is subsequently powered by external power (e.g., AC Mains), microcontroller 126 may retrieve data from the NVM associated with NFC device 124 and act on it, for example setting an output current level, selecting an active dimming interface, etc.

In another embodiment, NFC programming unit 110 communicates with microcontroller 126, simultaneously powering microcontroller 126 via a second supply voltage generated by NFC device 124 from the received NFC RF signal, and retrieving data from microcontroller 126, or a second NVM associated with microcontroller 126. For example, in this embodiment, NFC programming unit 110 may upgrade the firmware of microcontroller 126.

In yet another embodiment, NFC programming unit 110 may communicate with microcontroller 126 via NFC device 124, and control power stage 128 by turning it ON/OFF or dimming the light source(s) of a lighting unit 130 connected to and driven by power stage 128.

In some embodiments, NFC device 124 sends a return NFC RF verification signal via antenna 121 to indicate that data has been successfully received from NFC programming unit 110. In some embodiments, NFC device 124 transmits one or more operating parameters, configuration settings, or operating data for programmable lighting device 120 to NFC programming unit 110 with an NFC RF signal via antenna 121.

Figure 2:
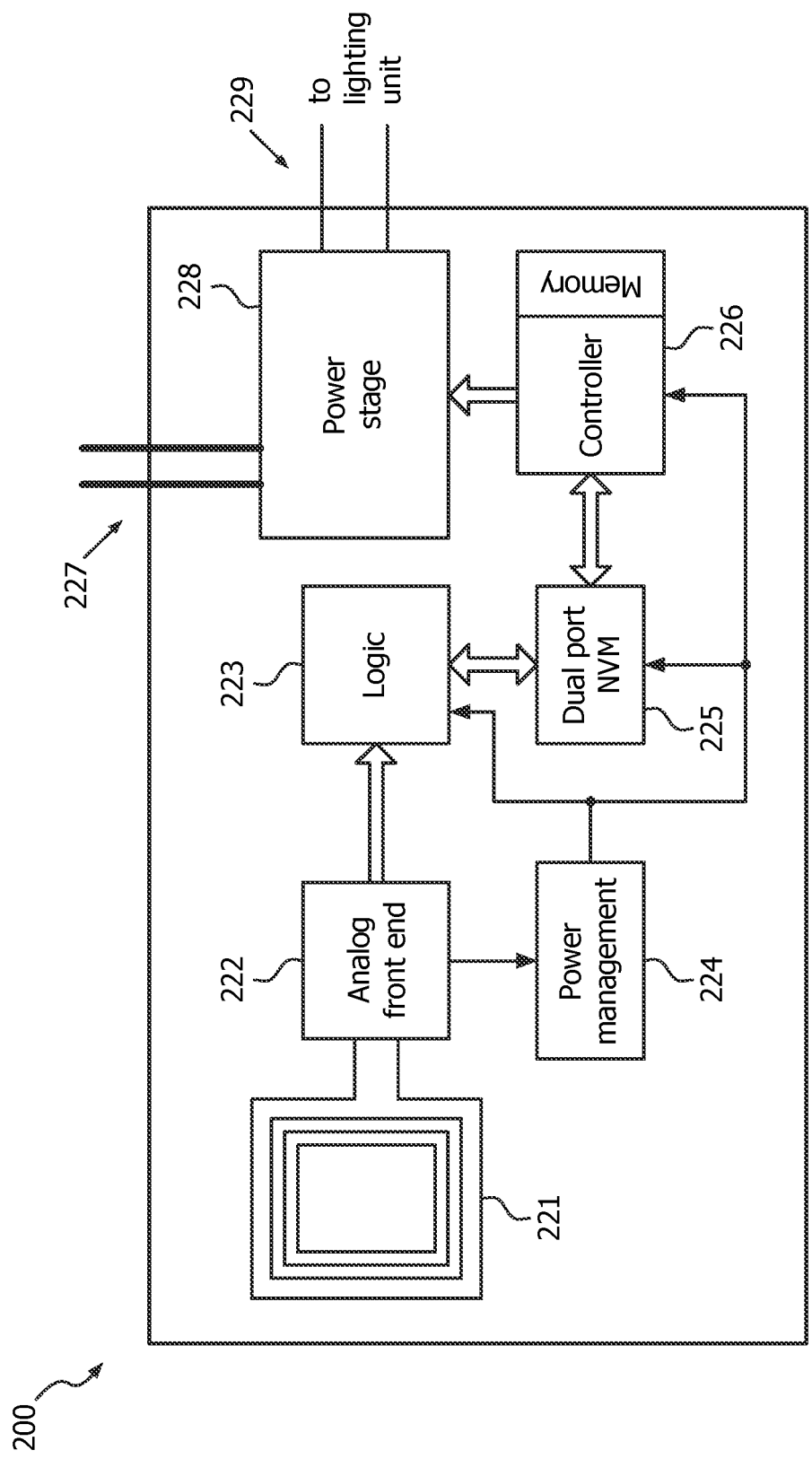
FIG. 2 is a functional block diagram of one embodiment of a programmable lighting device.

FIG. 2 is a functional block diagram of one embodiment of a programmable lighting device 200 which may be an example of programmable lighting device 120 of FIG. 1.

Programmable lighting device 200 includes a coil (or inductor) or RF antenna 221, an analog front end 222, logic 223, a power management unit 224, a dual port nonvolatile memory (NVM) 225, a controller 226, and a power stage 228. Analog front end 224 comprises an NFC transceiver and may include functions such as a demodulator and/or a modulator. Logic 223 communicates data between analog front end 222 and dual port NVM 225. Power management unit 224 harvests power from a received NFC RF signal and converts that power to a form (e.g., one or more supply voltages) which may be used to power other elements of programmable lighting device 200, for example logic 223, dual port NVM 225, and controller 226.

Analog front end 222, logic 223, and power management unit 224 comprise a near field communication (NFC) device.

Dual port NVM 225 may have a first port by means of which memory cells are accessible by logic 223, and a second port by means of which memory cells are accessible by controller 226. In some embodiments, dual port NVM 225 may comprise an electrically erasable programmable read only memory (EEPROM). In some embodiments, dual port NVM 225 may comprise Flash memory.

Power stage 228 receives power from an external power supply, for example 60 Hz AC Mains power at 110VAC, 50 Hz AC Mains power at 230 V, etc., via power connector 227. Power stage 228 converts or formats the power to an appropriate form for use by a lighting unit, for example an LED-based lighting unit having a plurality of LED light sources, and supplies the converted power to the lighting unit via an output interface 229.

In some embodiments, lighting device 200 may include a lighting unit, including one or more light sources. In some embodiments, the lighting unit may include one or more LEDs, which may be white LEDs and/or color LEDs. In some embodiments, power stage 228 may provide a different output signal level (e.g., different current level) depending on the light sources which it drives. In some embodiments, one or more operating parameters for driving specific light sources may be communicated to programmable lighting device 200 via an NFC RF signal.

Figure 3:
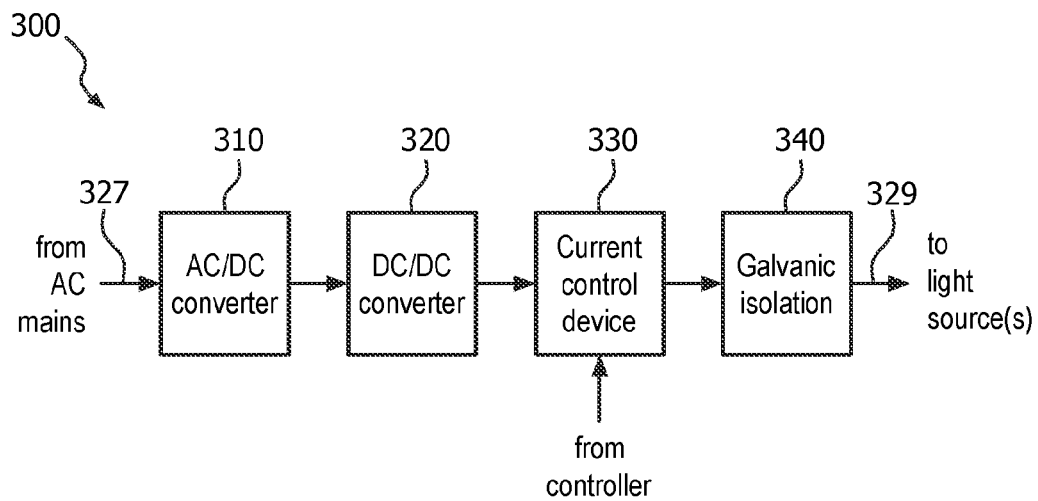
FIG. 3 is a functional block diagram of one embodiment of a power stage of a programmable lighting device.

FIG. 3 is a functional block diagram of one embodiment of a power stage 300 of a programmable lighting device. Power stage 300 is one embodiment of power stage 128 of FIG. 1 and of power stage 228 of FIG. 2. In particular, power stage 300 is an example of a power stage for one embodiment of an LED driver. Power stage 300 includes an AC/DC converter 310, a DC/DC converter 320, a current control device 330, and a galvanic isolation device 340.

In some embodiments, AC/DC converter 310 may comprise a rectifier. In some embodiments, current control device 330 may comprise one or more switching devices (e.g., field effect transistors). In some embodiments, galvanic isolation device 340 may comprise the input winding of an isolation transformer.

In operation, power stage 300 receives at its input 327 AC power from an external power source, for example AC Mains. AC/DC converter 310 converts the input power from AC to DC, and DC/DC converter 320 converts the DC voltage to a desired level for driving a particular lighting unit based on its light sources (e.g., LEDs). Current control device 330 operates in response to one or more control signals provided by a controller (e.g., controller 226 of FIG. 2) to output a desired current to the lighting unit by output terminals 329. For example, in some embodiments the controller may provide one or more pulse width modulated (PWM) signals to control switching operations of one or more switches of current control device 330. In some embodiments, the controller may generate the control signal(s) based on one or more configuration settings or operating parameters received as data in an NFC RF signal by analog front end 222 via coil or antenna 221, and in response thereto stored in dual port NVM 225.

Various embodiments of power stage 300 may omit one or more of these elements. For example, where power stage 300 receives power from an external DC power supply, then AC/DC converter 310 may be omitted. In some embodiments where galvanic isolation is not required between a lighting driver and a lighting unit, for example, then galvanic isolation device 340 may be omitted.

Referring back to FIG. 2, in some embodiments controller 226 includes a second nonvolatile memory (e.g., EEPROM or Flash memory). The second nonvolatile memory may store therein configuration settings and operating parameters for programmable lighting device 200, including for example configuration settings and operating parameters received by the NFC device via antenna 221 and stored in dual port NVM 225. The second nonvolatile memory may also store therein operating data for lighting device 200. Examples of such operating data may include: a number of operating hours for lighting device 200 and/or for a lighting unit which is driven by lighting device 200; PWM settings for controlling power stage 228; sensed maximum and minimum temperature values of lighting device 200 and/or for a lighting unit which is driven by lighting device 200; a serial number of lighting device 200 and/or a lighting unit which is driven by lighting device 200; a network address for lighting device 200 and/or for a lighting unit which is driven by lighting device 200 when lighting device 200 and/or the lighting unit is connected in a network (e.g., a DALI network); etc. In some embodiments, operating data may be transferred from the second nonvolatile memory associated with controller 226 to dual port NVM 225 from where it can be transmitted via an NFC RF signal to an external monitoring device.

Figure 4:
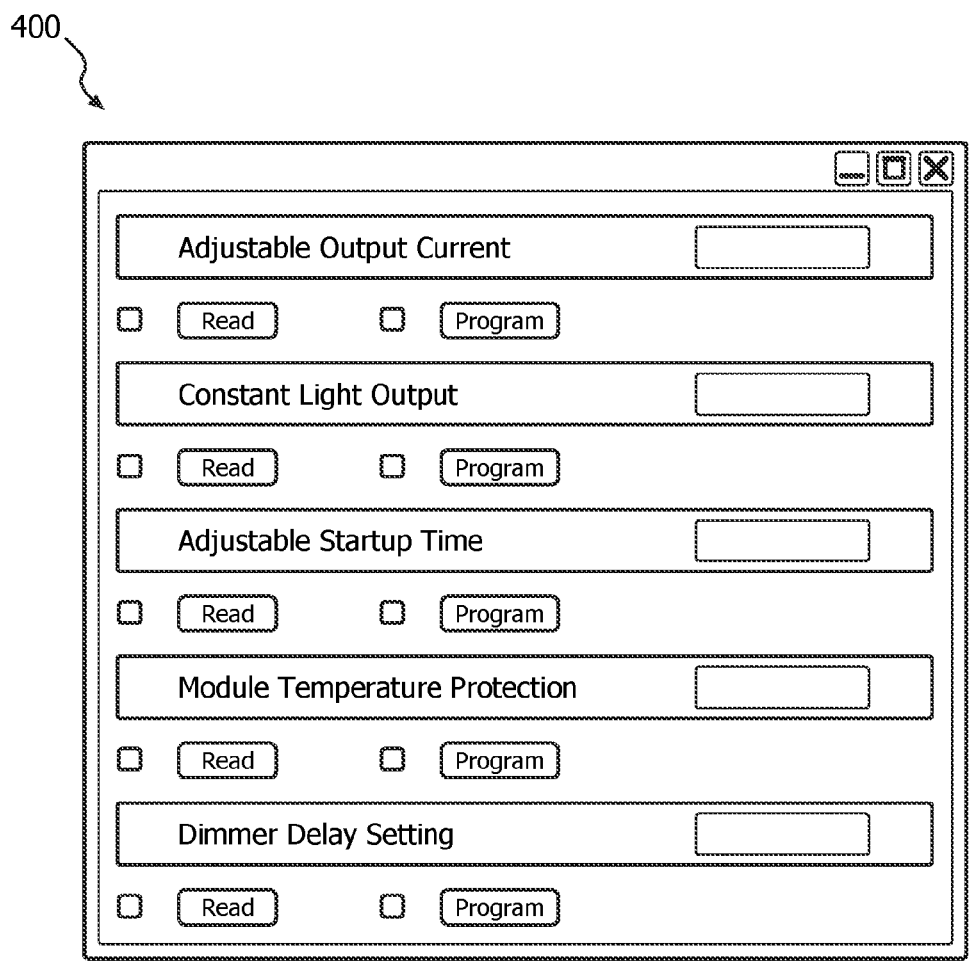
FIG. 4 illustrates a user interface which may be employed for programming one or more configuration settings and/or operating parameters into nonvolatile memory of a programmable lighting device.

FIG. 4 illustrates a user interface 400 which may be employed for programming one or more configuration settings and/or operating parameters into nonvolatile memory of a programmable lighting device. In some embodiments, user interface 400 may be provided to a user via a computer display screen, and the user may select one or more operating parameters with a keyboard, mouse, trackball, etc. In some embodiments, user interface 400 may be provided to a user via a touch screen of a portable device, such as a mobile phone, a tablet device, etc.

User interface 400 may be employed to program a variety of configuration settings and operating parameters into a programmable lighting device, and to read back configuration settings and operating parameters from the programmable lighting device to an external programming unit or monitoring device.

Examples of configuration settings include a serial number for the programmable lighting device, an active dimming interface for the programmable lighting device among a plurality of dimming interfaces available for the programmable lighting device, and firmware for a controller (e.g., controller 226 in FIG. 3) of the programmable lighting device. In various embodiments, dimming interfaces available for the programmable lighting device may include a DALI interface, an analog 0-10V dimming signal interface, a Digital MultipleX (DMX) interface, and/or a phase-cut AC dimming interface. Other dimming control options are possible.

Examples of operating parameters include an output current to be supplied by the power stage to the light source(s); a variable startup time parameter for the light source(s); an operating time period after which the lighting device should increase the output current; at least one temperature threshold for reducing the output current; an operating time period after which the lighting device should trigger an end of life signal; and at least one time setting for automatically dimming the at least one light source.

In some embodiments, operating parameters of a programmable lighting device which may be configured via NFC communication include the following.

Constant Light Output (CLO): Capability of LED driver to count number of operating hours of LED light source and counteract the depreciation of lumen output by increasing drive current to LED. The operating hours at which LED current must increase are stored as settings in LED driver which may be programmed by end user.

Adjustable Startup Time (AST): Variable startup time of LED current from OFF state to maximum output current.

Module Temperature Protection (MTP): Ability of LED driver to sense temperature of LED light source and reduce current. This avoids overheating of LED and hence increases its life. The temperature thresholds to activate current reduction are programmable parameters in LED driver.

End of Life (EOL): Capability of LED driver to count number of operating hours of LED light source and flash when it nears end of operational life. The flashing occurs only at turn ON of light source and then continues normal operation. The operating hours at which flashing must be triggered is programmable in LED driver.

Dynadimmer settings: Driver feature that allows automatic dimming at night. The time instances at which dimming must start is programmable by end user.

Dimming interface selection: Programmable LED driver is capable of supporting multiple dimming interfaces like 1-10V, DALI, Dynadimmer etc. The selection of which interface is active is programmable by end user.

In some embodiments, programmable lighting devices (e.g., LED drivers) as described above may be housed in a plastic, rubber, or other non-metallic housing. However in some cases, building codes and/or safety concerns may necessitate the use of an electrically conductive (e.g., metallic) housing, for example to permit the housing to be electrically grounded. In that case, provisions must be made for the NFC RF signal to reach the coil or RF antenna of the programmable lighting device.

Figure 5:
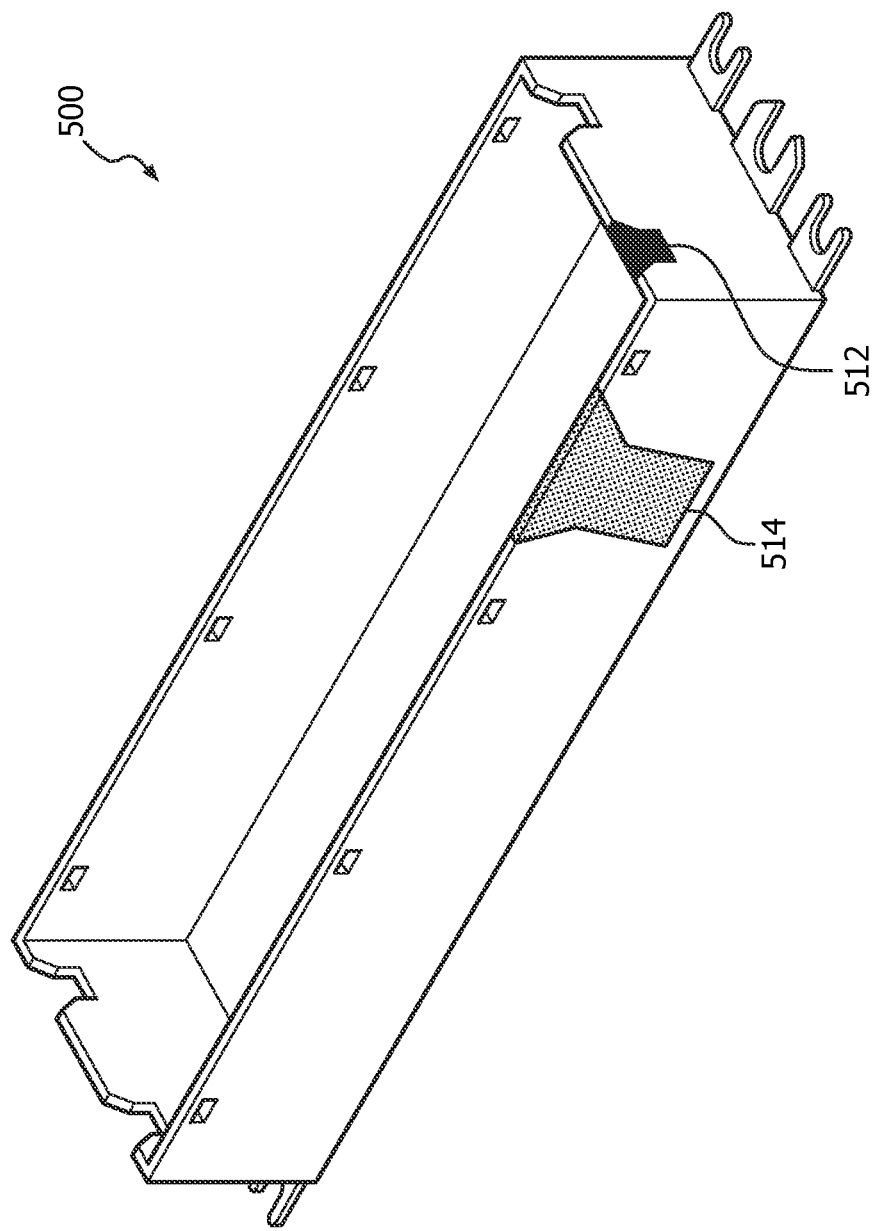
FIG. 5 illustrates one embodiment of a housing for a programmable lighting device.

FIG. 5 illustrates one embodiment of a housing 500 for a programmable lighting device. Housing 500 is a substantially metallic housing, but includes first and second non-metallic (e.g., plastic or rubber) grommets 512 and 514, which comprise apertures through which an NFC RF signal may be received by a programmable lighting device housed within housing 500. Grommets 512 and 514 may be used to hold and seal wires coming out from a driver mounted within housing 500. Grommets may be placed on any side of substantially metallic housing 500, and may be of any shape and size. For example, in some embodiments a grommet may be as big as the height of housing 500.

In some embodiments, a coil or RF antenna (e.g., element 121 in FIG. 1 or element 221 in FIG. 2) may be embedded into a grommet, or may be attached to a grommet.

Figure 6A:
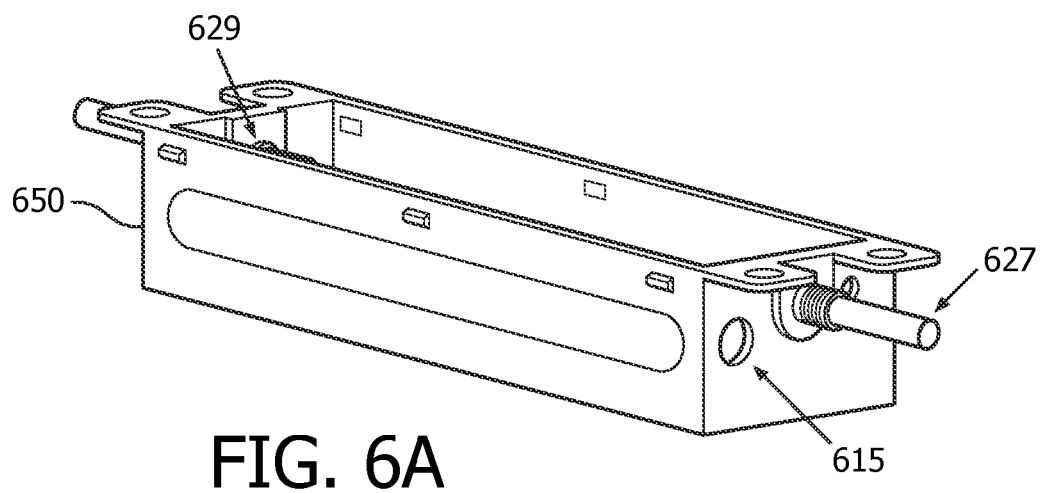
FIGS. 6A and 6B illustrate another embodiment of a housing for a programmable lighting device.
Figure 6B:
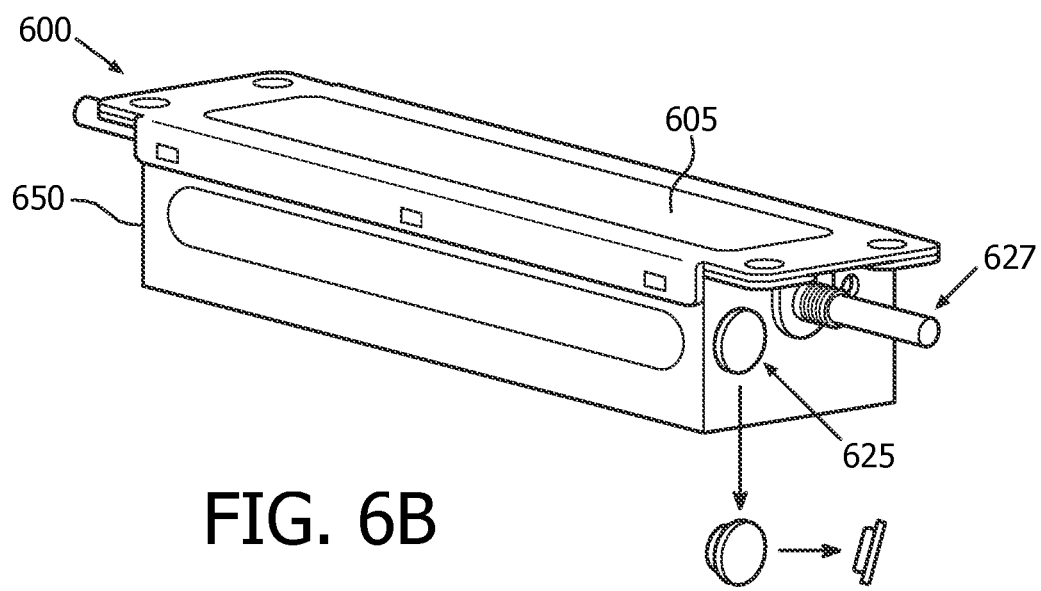

FIGS. 6A and 6B illustrate another embodiment of a housing 650 for a programmable lighting device 600. Housing 650 is a substantially metallic housing and supports a first connector 627 and a second connector 629. In some embodiments, first connector 627 may supply external power (e.g., AC Mains power) to lighting device 600. In some embodiments, second connector 629 may supply output power to a lighting unit.

Housing 650 includes an aperture 615 through which an NFC RF signal may be received by a programmable lighting device housed within housing 650. In some embodiments, aperture 615 may have a non-metallic (e.g., a rubber) grommet 625 inserted therein.

Figure 7A:
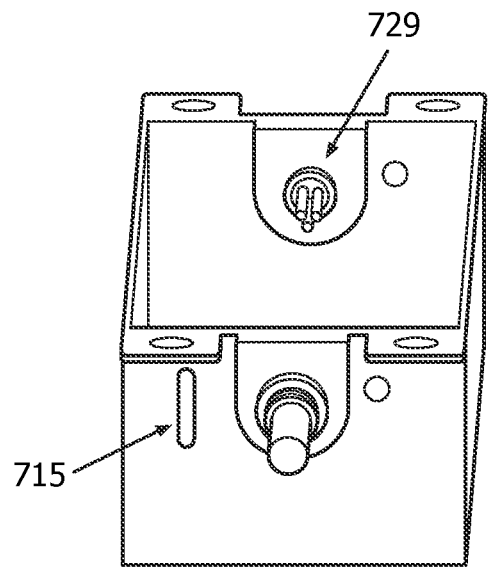
FIGS. 7A and 7B illustrate yet another embodiment of a housing for a programmable lighting device.
Figure 7B:
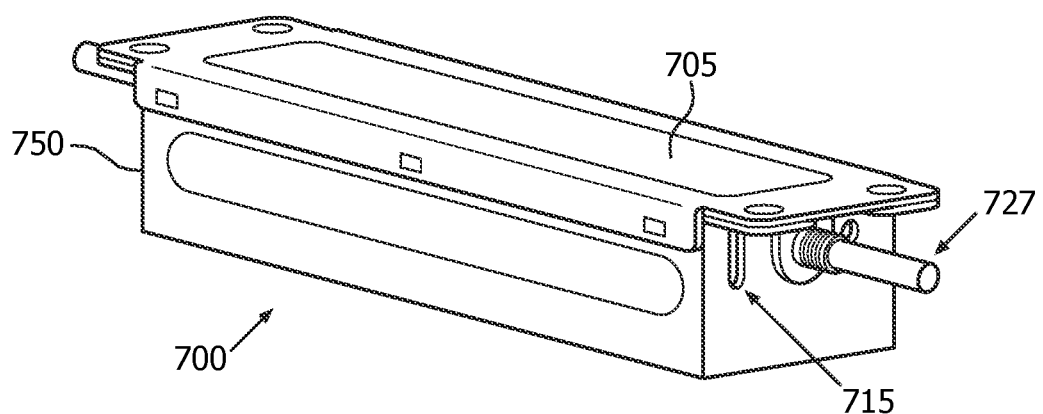

FIGS. 7A and 7B illustrate yet another embodiment of a housing 750 for a programmable lighting device 700. Housing 750 is a substantially metallic housing and supports a first connector 727 and a second connector 729. In some embodiments, first connector 727 may supply external power (e.g., AC Mains power) to lighting device 700. In some embodiments, second connector 729 may supply output power to a lighting unit.

Housing 750 includes an aperture 715 through which an NFC RF signal may be received by a programmable lighting device housed within housing 750.

Other arrangements taking advantage of a lighting device which includes an NFC element are contemplated. For example, an outdoor lighting controller (OLC) designed for the U.S. has a limited number of input pins to be compatible with a legacy National Electrical Manufacturers Association (NEMA) standard socket. To add dimming capability, a custom socket needs to be built to accommodate additional wires. In some embodiments, NFC communication may be used to transmit and receive data from an electronic driver to provide dimming capability and hence avoid the need to create a custom socket.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed.

Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A programmable lighting driver, comprising:
   a power stage configured to receive power from an external supply and to supply power to at least one light source;
   a controller configured to control an operation of the power stage according to at least one operating parameter or configuration setting for the programmable lighting driver;
   a nonvolatile memory configured to store therein the at least one operating parameter or configuration setting for the programmable lighting driver; and
   a near field communication driver configured to receive a radio frequency (RF) signal which communicates the at least one operating parameter or configuration setting for the programmable lighting driver, and in response thereto to store the at least one operating parameter or configuration setting for the programmable lighting driver in the nonvolatile memory,
   wherein the near field communication driver is configured to generate from the RF signal a supply voltage for powering the nonvolatile memory while the near field communication driver stores in the nonvolatile memory the at least one operating parameter or configuration setting for the programmable lighting driver,
   wherein the at least one operating parameter for the programmable lighting driver includes at least one of: an output current to be supplied by the power stage to the at least one light source; a variable startup time parameter for the at least one light source; an operating time period after which the lighting driver should increase the output current; at least one temperature threshold for reducing the output current; an operating time period after which the lighting driver should trigger an end of life signal; and at least one time setting for automatically dimming the at least one light source; and
   the RF signal communicates the at least one configuration setting for the programmable lighting driver, wherein the at least one configuration setting identifies an active dimming interface for the programmable lighting driver among a plurality of dimming interfaces available for the programmable lighting driver.

2. The programmable lighting driver of claim 1, wherein the near field communication device is further configured to generate from the RF signal a second supply voltage for powering the controller.

3. The programmable lighting driver of claim 1, further comprising an antenna or a coil configured to provide the radio frequency signal to the near field communication driver.

4. The programmable lighting driver of claim 3, wherein the near field communication device is further configured to transmit a verification signal via the antenna or coil in response to receiving the at least one operating parameter or configuration setting for the programmable lighting driver.

5. The programmable lighting driver of claim 3, wherein the near field communication device is further configured to transmit via the antenna or coil at least one additional operating parameter, at least one additional configuration setting, or operating data for the programmable lighting driver.

6. The programmable lighting driver of claim 3, further comprising a substantially metallic housing having at least one non-metallic aperture through which the radio frequency signal may be communicated to the antenna or coil.

7. The programmable lighting driver of claim 1, wherein the nonvolatile memory is a dual port memory having a first port for communicating with the near field communication device and a second and a second port for communicating with the controller.

8. The programmable lighting driver of claim 1, further comprising a second nonvolatile memory, wherein the second nonvolatile memory is configured to store operating data for programmable lighting driver in response to the controller.

9. The programmable lighting device of claim 1, wherein the power stage comprises a controllable current source for supplying a current to drive at least one LED.

10. The programmable lighting driver of claim 9 wherein the power stage is configured to receive AC Mains voltage and further comprises a rectifier for rectifying the AC Mains voltage to produce the current to drive the at least one LED.

11. The programmable lighting driver of claim 1, wherein the plurality of dimming interfaces available for the programmable lighting driver include a DALI interface, an analog dimming signal interface, a Digital MultipleX (DMX) interface, and a phase-cut AC dimming interface.

12. A method of programming a programmable lighting driver the method comprising:
    receiving a radio frequency (RF) signal which communicates at least one operating parameter or configuration setting for the programmable lighting driver;
    generating from the RF signal a supply voltage for powering a nonvolatile memory of the programmable lighting driver;
    while the nonvolatile memory is powered by the voltage generated from the RF signal, storing at least one operating parameter or configuration setting for the programmable lighting driver in the nonvolatile memory, and
    wherein a power stage of the programmable lighting driver is configured to receive power from an external supply and to be controlled to supply power to at least one light source according to the at least one operating parameter or configuration setting for the programmable lighting driver; and
    generating from the RF signal a second supply voltage for powering a controller which is configured to control the power stage.

13. The method of claim 12, further comprising the controller retrieving the least one operating parameter or configuration setting for the programmable lighting driver from the nonvolatile memory.

14. The method of claim 12, further comprising transmitting a verification signal from the programmable lighting driver in response to receiving the at least one operating parameter or configuration setting for the programmable lighting driver.

15. The method of claim 12, further comprising transmitting from the programmable lighting driver via a reply RF signal at least one additional operating parameter, at least one additional configuration setting, or operating data for the programmable lighting driver.

16. The method of claim 12, wherein receiving the RF signal comprises receiving the RF signal via least one non-metallic aperture in a substantially metallic housing.

17. The method of claim 12, further comprising identifying an active dimming interface for the programmable lighting driver among a plurality of dimming interfaces available for the programmable lighting driver, wherein the plurality of dimming interfaces available for the programmable lighting driver include a DALI interface, an analog 0-10 V dimming signal interface, a Digital MultipleX (DMX) interface, and a phase-cut AC dimming interface.

* * * * *